US005689663A

United States Patent [19]

Williams

[11] Patent Number: 5,689,663
[45] Date of Patent: Nov. 18, 1997

[54] REMOTE CONTROLLER USER INTERFACE AND METHODS RELATING THERETO

[75] Inventor: John C. Williams, Mercer Island, Wash.

[73] Assignee: Microsoft Corporation, Redmond, Wash.

[21] Appl. No.: 472,052

[22] Filed: Jun. 6, 1995

Related U.S. Application Data

[63] Continuation of Ser. No. 898,212, Jun. 19, 1992, abandoned.

[51] Int. Cl.⁶ ........................................ G06F 3/14
[52] U.S. Cl. ................ 395/327; 395/328; 395/970; 395/349; 395/354
[58] Field of Search ........................ 395/159, 161, 395/154, 155, 156, 157, 160, 327, 328, 349, 354, 348, 352, 326, 970, 972; 345/146, 902; 348/734, 563, 569, 7, 10, 12, 13

[56] References Cited

U.S. PATENT DOCUMENTS

| | | | |
|---|---|---|---|
| 4,962,473 | 10/1990 | Crain | 340/541 |
| 5,047,867 | 9/1991 | Strubbe et al. | 348/569 X |
| 5,148,154 | 9/1992 | MacKay et al. | 395/328 X |
| 5,157,496 | 10/1992 | Kurosawa | 348/734 |
| 5,191,645 | 3/1993 | Carlucci et al. | 395/328 |
| 5,202,961 | 4/1993 | Mills et al. | 395/328 |
| 5,212,553 | 5/1993 | Maruoka | 348/563 |
| 5,257,349 | 10/1993 | Alexander | 395/348 X |
| 5,307,055 | 4/1994 | Baskin et al. | 348/734 X |
| 5,367,316 | 11/1994 | Ikezaki | 348/734 X |
| 5,388,197 | 2/1995 | Rayner | 395/328 |
| 5,477,262 | 12/1995 | Banker et al. | 348/7 |
| 5,479,268 | 12/1995 | Young et al. | 348/734 X |

FOREIGN PATENT DOCUMENTS 0390041  10/1990  European Pat. Off. .......... H04B 1/20

OTHER PUBLICATIONS

"New Software Enhances Capability of ICS Model 4811 Bus Analyzer", News Release, Milpitas, CA, Feb. 26, 1991 (IAC New Prod. Annou.).

*Primary Examiner*—Raymond J. Bayerl
*Attorney, Agent, or Firm*—Seed and Berry LLP

[57] ABSTRACT

A remote controller user interface for accessing information within a computer system. The remote controller contains a window display area for displaying pictorial, graphical and textual information, and a button bank area for controlling the information displayed within the window display area. In a preferred embodiment, the remote controller is generated by a computer program which permits the user to access information about movies. By selecting the appropriate button of the remote controller, various information is displayed within the window display area of the remote controller, as well as upon the screen of the computer system display device. By use of the remote controller, users with little or no prior computer experience are confronted with a recognizable user interface which permits easy access to information.

18 Claims, 16 Drawing Sheets

REMOTE CONTROLLER USER INTERFACE AND METHODS RELATING THERETO

CROSS-REFERENCE TO RELATED APPLICATION

This application is a continuation of U.S. patent application Ser. No. 07/898,212, filed Jun. 12, 1992, now abandoned.

TECHNICAL FIELD

This invention is generally directed to a user interface for a computer system, and more specifically, to a remote controller visual display and methods relating thereto.

BACKGROUND OF THE INVENTION

A computer system displays information to the user by a visual display. The ability of a user to access the information quickly and conveniently is, in large part, dependent upon the ease by which the user may interact with the computer through its visual display. Numerous advances in user interface design have been made which simplify the user's interaction with the computer system. For example, the click and point characteristics of a mouse offer the user a visual alternative to conventional keyboard input. Similarly, pull-down menus provide the user with a convenient technique for selecting available computer system options or commands, and multiple windowing visual displays permit a user to jump from one task to another quickly and easily.

With the increasing development of storage capacity, such as CD-ROM technology, computer systems may store vast quantities of textual, graphical, pictorial and audio information. For such information to be readily accessible, a convenient and recognizable user interface is needed. The interface should allow the user to access the information quickly, while at the same time presenting the user with a familiar environment.

SUMMARY OF THE INVENTION

Accordingly, it is an object of the present invention to provide a user interface for a computer system which permits the user access to information stored by the computer system in a convenient and recognizable manner. It is a further object to provide a computer system which generates a remote controller visual display, the remote controller allowing the user access to the stored information in a manner akin to a television remote control. The present invention fulfils these objects, and provides further related advantages.

The present invention discloses a user interface for a computer system which employs a visual display of a remote controller. The remote controller allows the user to access information stored by the computer system, including textual, graphical, pictorial and audio information, and presents the user with a familiar and convenient interface.

In one embodiment, the remote controller visual display is generated by a computer program which contains information regarding a specific topic. In a preferred embodiment, the computer program contains information about various films, including the actors and actresses, directors, awards received, running time, etc. The remote controller is displayed on at least a portion of the visual display of the computer system while the program is running, and allows easy access to the movie information by the user.

The remote controller of the present invention has a display window area sized to display pictorial, graphical or textual information, and a button bank area having at least one button which selectably controls the information displayed in the display window area. When a button is selected in the button bank area, the remote controller displays pictorial, graphical or textual information within the window display area corresponding to the button selected in the button bank area. The relative area of the window display and the button bank may vary depending upon the selected function of the remote controller.

DETAILED DESCRIPTION OF THE INVENTION

Figure 1:
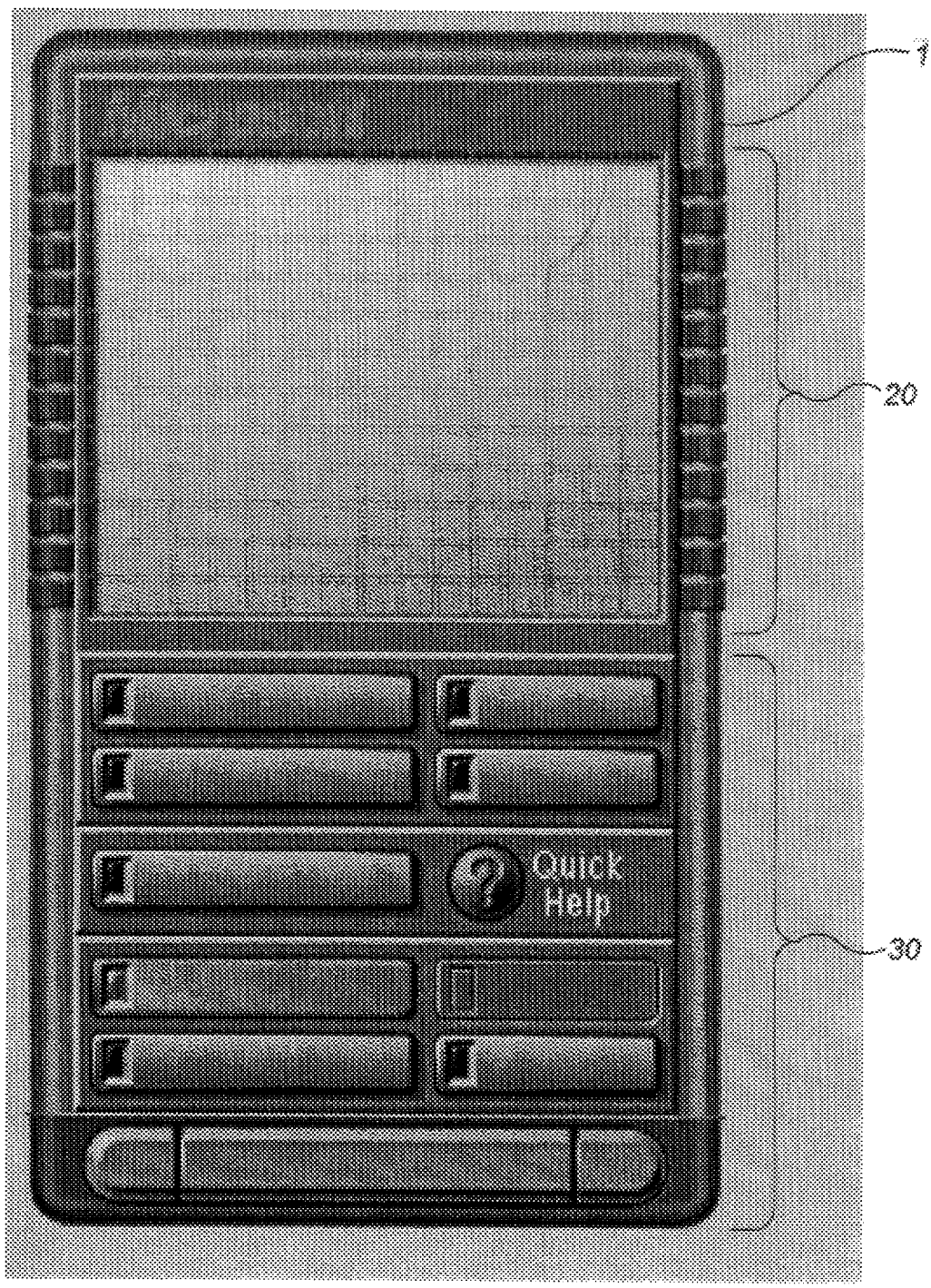
FIG. 1 illustrates a preferred embodiment of the remote controller of the present invention.

The present invention discloses a computer controlled visual display. The visual display is akin to a remote control for a television or a stereo, and permits a user to access various information of the computer system. Referring to FIG. 1, one embodiment of the remote control visual display is illustrated. In this figure, remote control (10) contains two areas: a remote controller display window area (20) and a remote controller button bank area (30) which may contain various buttons. The display window is an area of the remote controller for displaying various information, including graphical icons, pictures, textual material, selectable lists, etc. The button bank area of the remote controller allows the user to select various command options to access and display information within the remote controller display window.

Figure 2A:
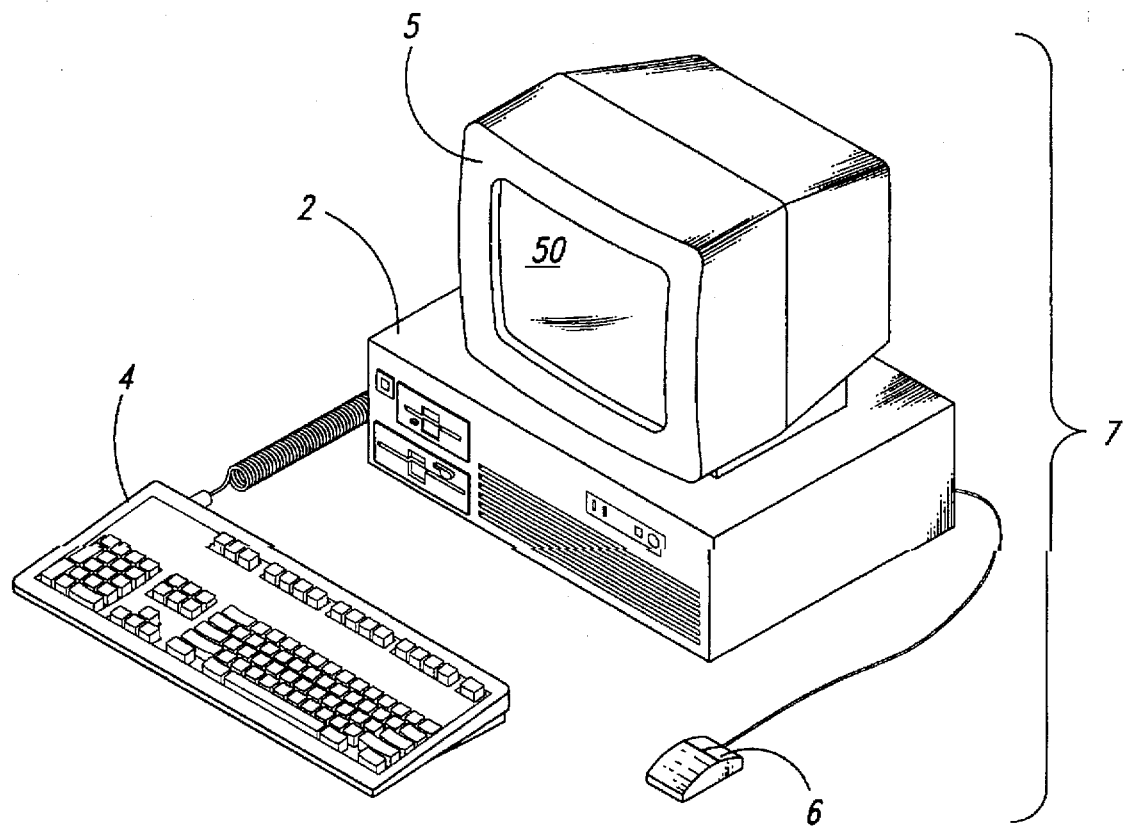
FIG. 2(a) illustrates a computer system.
Figure 2B:
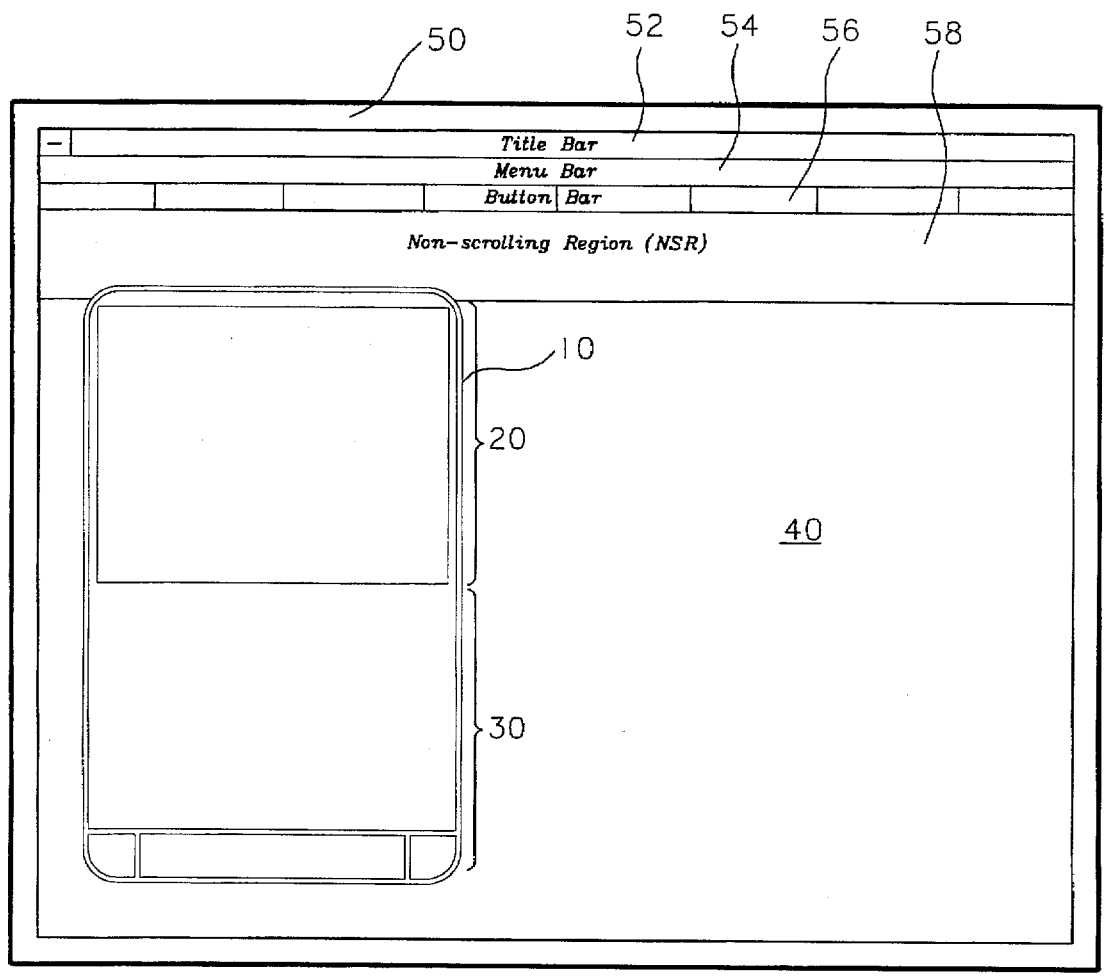
FIG. 2(b) illustrates a preferred screen layout, depicting the location of the remote controller and related regions of the screen display.
Figure 2C:
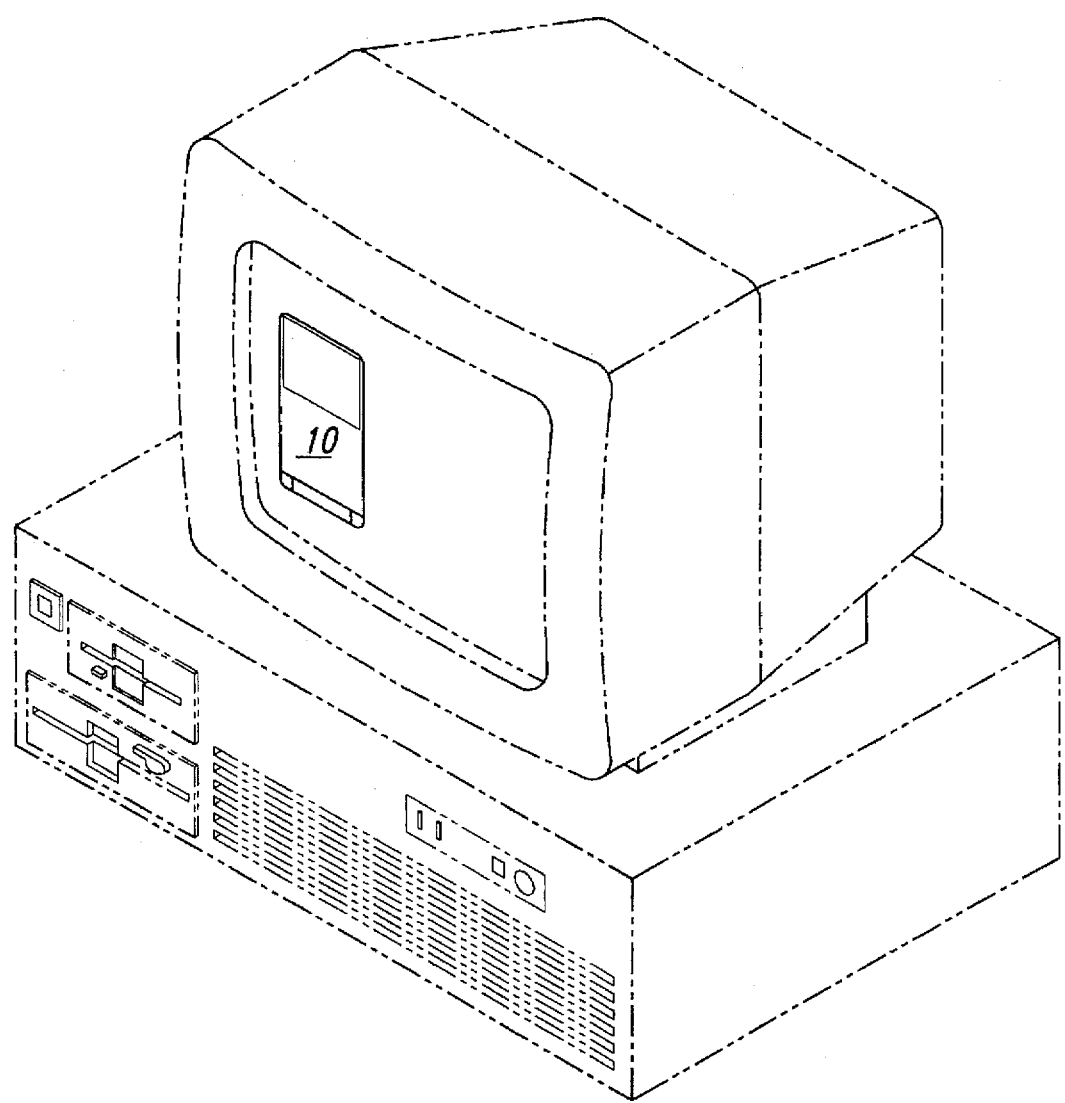
FIG. 2(c) illustrates the remote controller displayed on the visual display of a computer system.

The remote controller is displayed on screen (50) of the visual display (5) of computer system (7) as illustrated in FIG. 2A. In addition to visual display (5), computer system (7) includes computer (2), keyboard (4) and pointing device (6). As illustrated in FIG. 2B, remote control (10), having display window area (20) and button bank area (30), is displayed in approximately the left one-third of screen (50) of the visual display. The right two-thirds of screen (50) is reserved for displaying information, called the screen information area (40). While the configuration of FIG. 2B is preferred, the control device may consume a larger or smaller portion of the screen, and may be located at a different location on the screen. In addition, the relative portion of window display area and the button bank area of the remote controller may vary depending upon the selected function of the remote controller.

While the remote controller of this invention is described below in conjunction with a computer program for accessing and displaying movie information, the remote controller may be used as a visual display for any number of applications. For example, any computer system having a visual display, and capable of storing information, may benefit by use of the remote controller of the present invention. The remote controller is analogous to a familiar physical object (e.g., the television or stereo remote control). While the remote controller of the present invention offers many advantages over its physical counterpart (such as a display window area), users are still comfortable with this user interface, particularly users who have limited experience with computers. Accordingly, the remote controller of the present invention may serve as a convenient and recognizable visual display for any application where access to computer-stored information is desired.

In a preferred embodiment, the remote controller of the present invention is generated by a computer program which provides information regarding various movies. This program (hereinafter referred to as the "Microsoft Multimedia Movie Guide", or "Movie Guide" for short) serves as a comprehensive and authoritative reference source about movies and the people who make them. A user of this program may find the desired information, and move from movie reviews to biographies to other related movies, as well as to articles explaining aspects of movie making and the movie industry.

Figure 3:
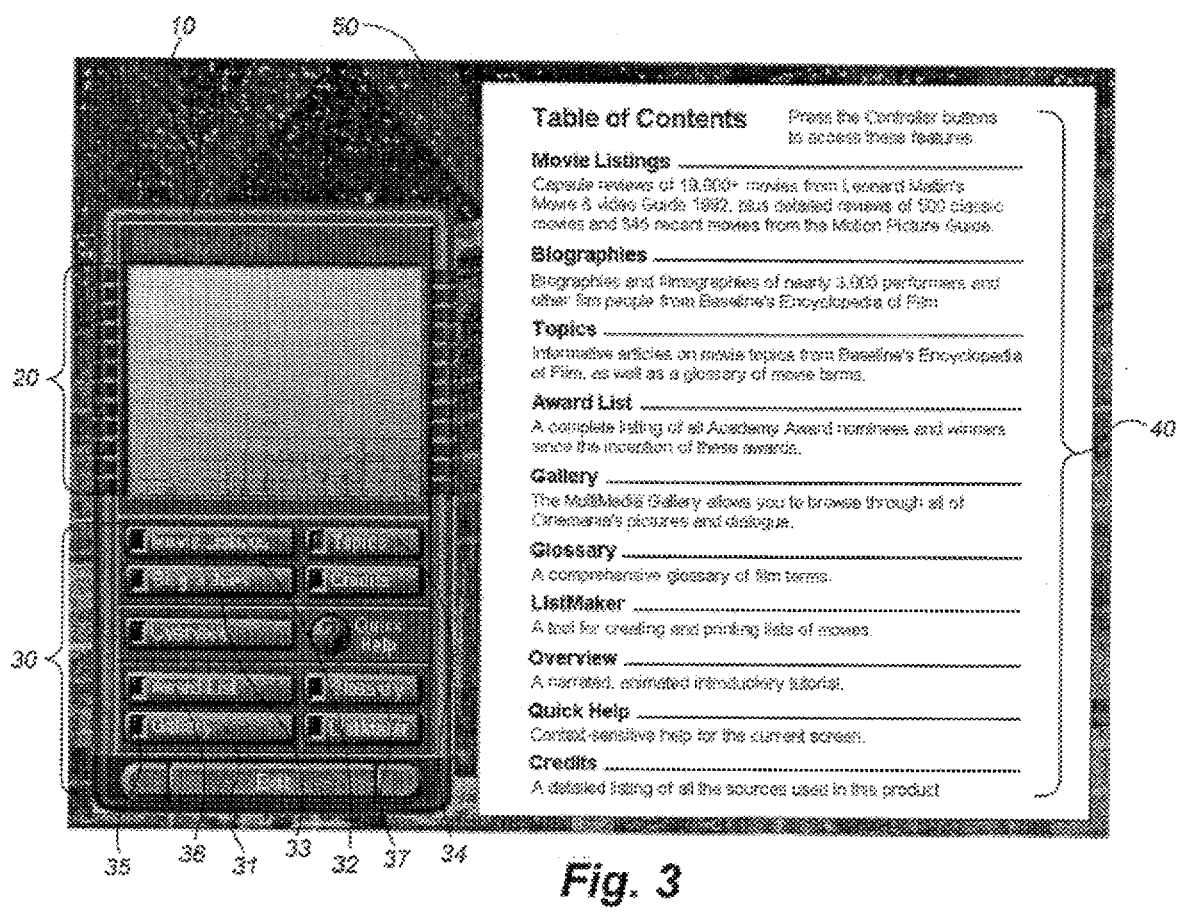
FIG. 3 illustrates a remote controller having specific functional buttons for a Movie Guide application.

When the Movie Guide is initiated, a screen appears as illustrated in FIG. 3. Essentially, this screen presents a table of contents, listing the selections available to the user. The remote controller (10) is displayed on screen (50), and has buttons within the button bank area (30) such as button (31) labeled "Gallery". Other buttons include those labelled "Movie Listings", "Biographies", "Topics", "Credits", "Overview", "Quick Help", "Award List", "List Maker", "Glossary" and "Exit". Within button (31), as well as all other buttons, is preferably an area (35) which changes color to indicate that the button (31) has been selected. Displayed within the screen information (40) area is a listing of the table of contents, and a brief explanation of each of the selectable options of the remote controller. When a button on the remote controller is selected, information may be displayed within the display window area (20), as well as within the screen information area (40) of the visual display (50).

Figure 4A:
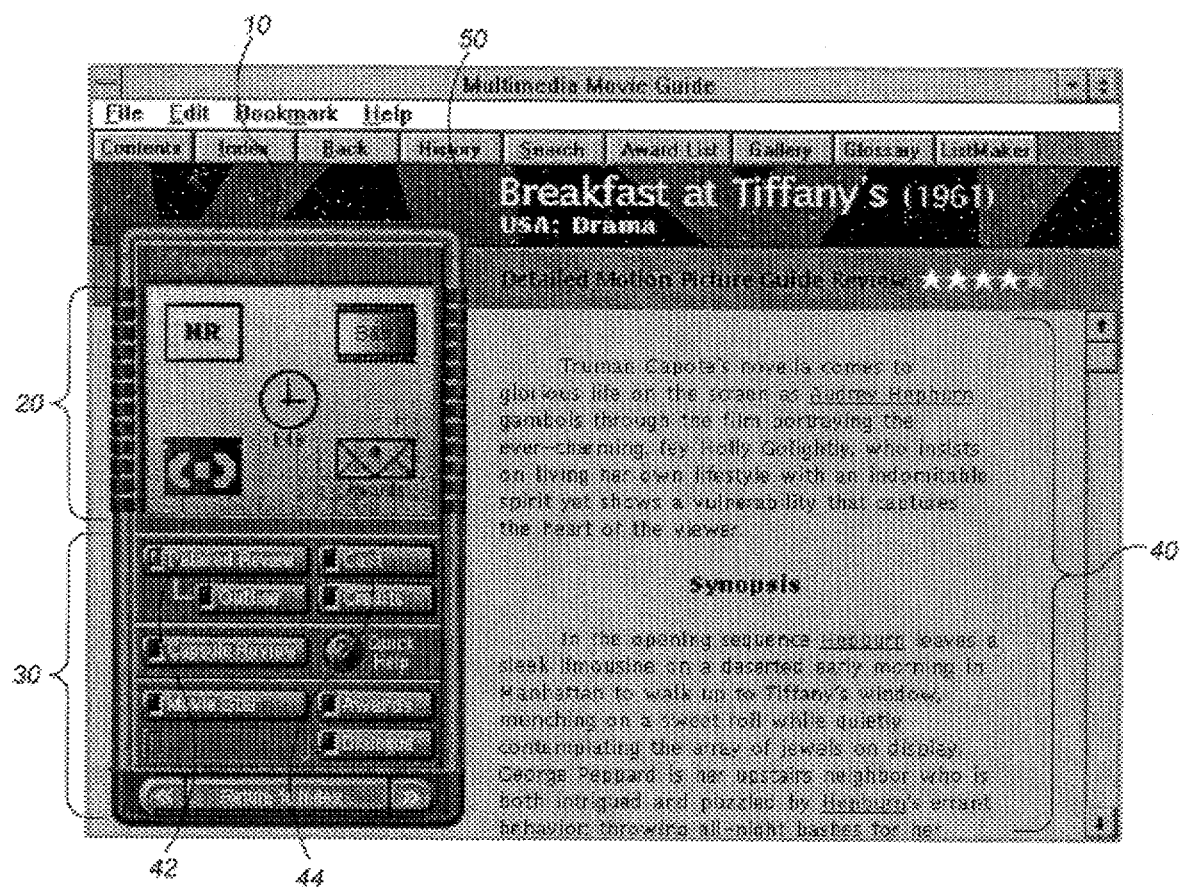
FIG. 4(a) illustrates the information displayed within the remote controller window display area and the various selectable options within the remote controller button bank area upon selection of a movie listing.

For example, if the "Movie Listing" button is selected (i.e., button (32) of FIG. 3), the window display area (20) of the remote controller (10) displays certain factual information concerning the movie of interest, and the button bank area (20) contains the available options which may be selected. As illustrated in FIG. 4(a), the user has selected the movie "Breakfast at Tiffany's". Within the window display area (20) of the remote controller (10), information about the movie is displayed in graphical form. Specifically, information regarding the movie is displayed within the remote controller's window display area (20) (e.g., rating, whether the film is black and white or color, running time of the movie, availability on videocassette, and whether the movie has received any Oscars).

Figure 4B:
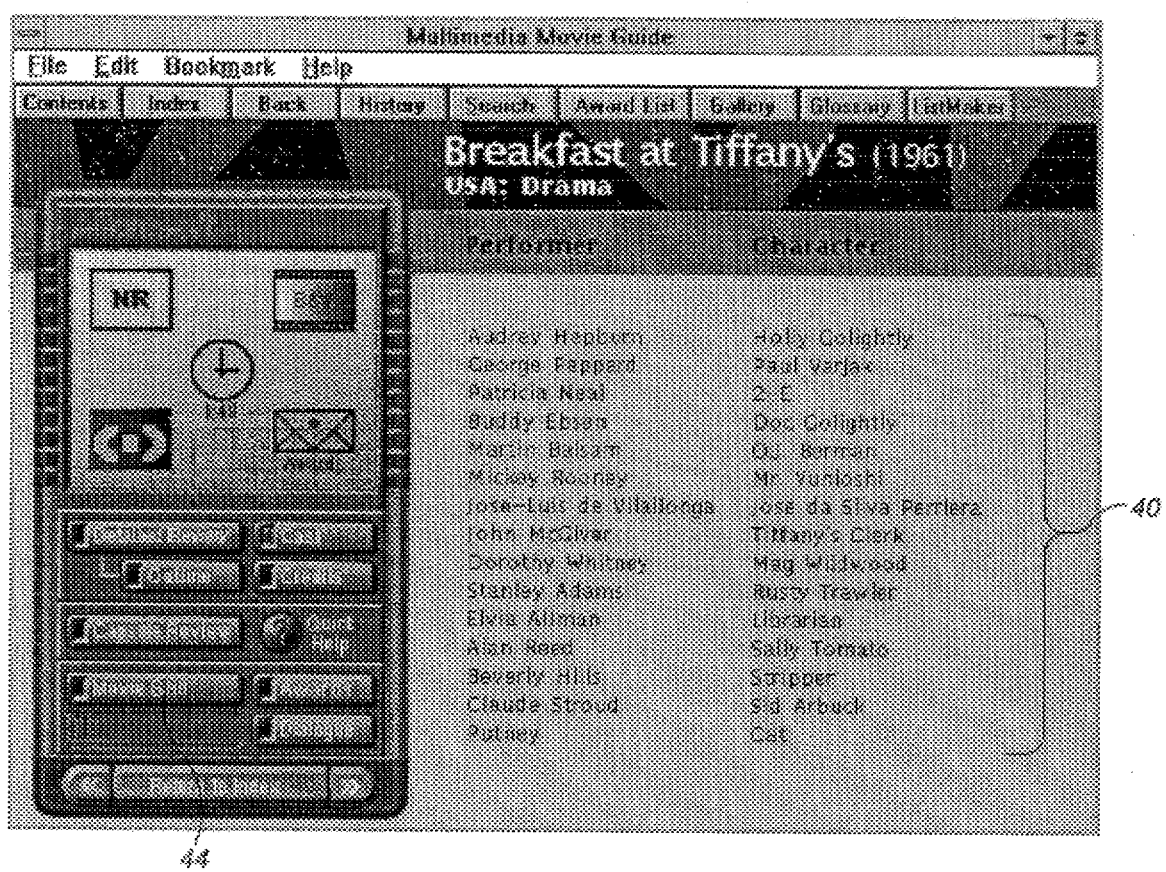
FIGS. 4(b) and 4(c) illustrate the selection of the buttons "Cast" and "Movie Stills", respectively.
Figure 4C:

By selecting the "Detailed Review" button (42) from the button bank area (30) of the remote controller (10), a detailed motion picture guide review is presented within the screen information area (40) of the visual display (30). By selecting the button "Cast" (44), FIG. 4(a), the screen information area (40) lists the various performers and their respective characters as illustrated in FIG. 4(b). Similarly, as illustrated in FIG. 4(c), selection of the "Movie Still" button (44) of FIG. 4(b) displays a still photograph from the film within the screen information area (40). Although not illustrated, audio excerpts from the film may also be accessed by the user through the remote controller.

Figure 5A:
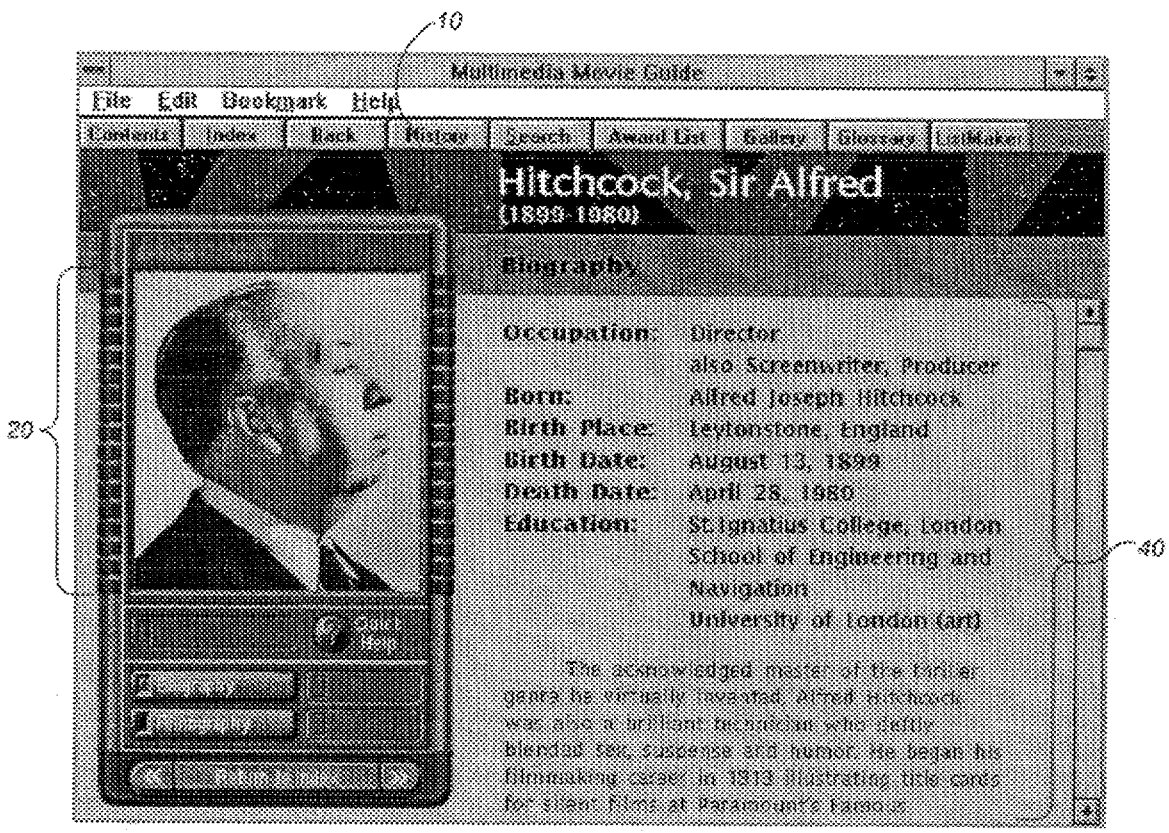
FIG. 5(a) and 5(b) illustrates the remote controller of the biographies screen and the selectable options available within the button bank area (i.e., selection of the "Biography" button and "Filmography" button, respectively).
Figure 5B:
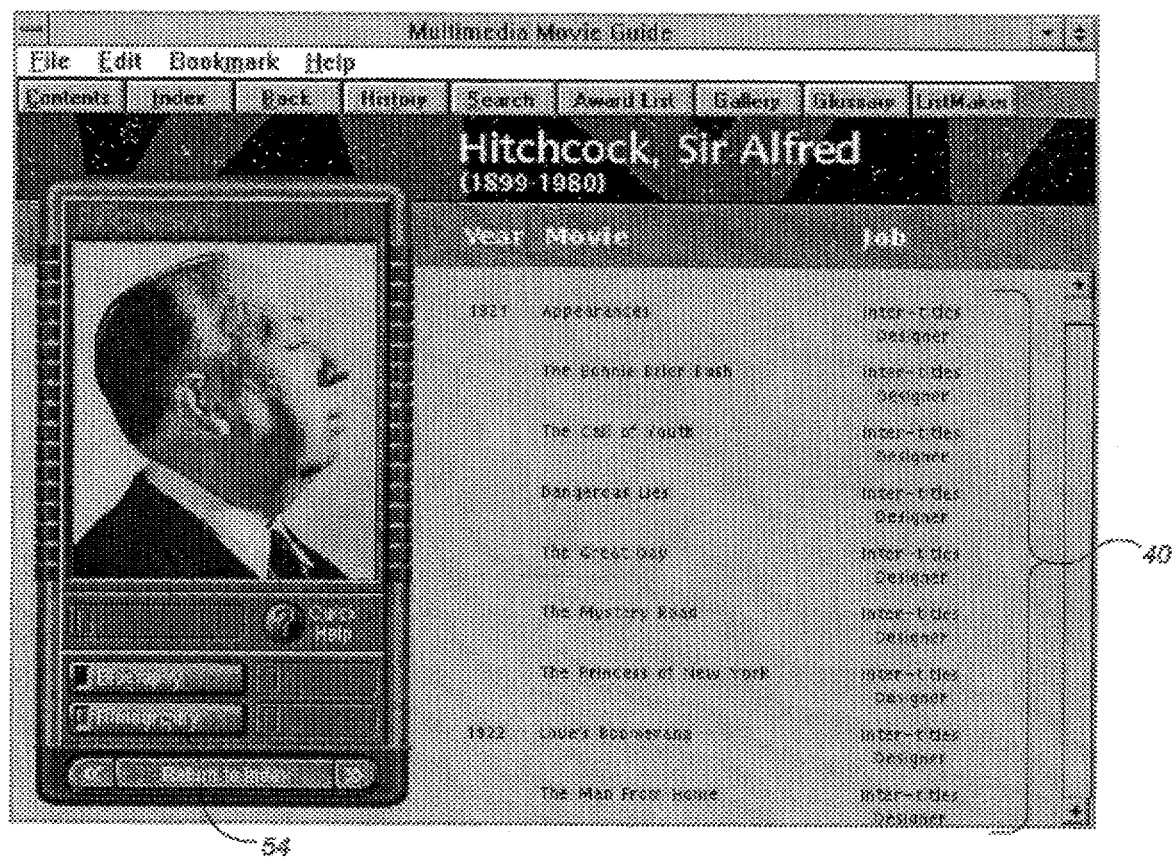

When the "Biographies" button (33) is selected (see FIG. 3), the remote controller (10) displays a still of the person selected, such as an actor, director or screenwriter in the window display area (20). As illustrated in FIG. 5(a), the biography of Alfred Hitchcock has been selected by the user. The remote controller (10) displays a still of Mr. Hitchcock in the remote controller window display area (20), and the buttons allow the user to display "Biography" information within the screen information area (40), or to display "Filmography" information in the screen information area (40) as illustrated in FIG. 5(b) by selecting the "Filmography" button (54).

Figure 6:
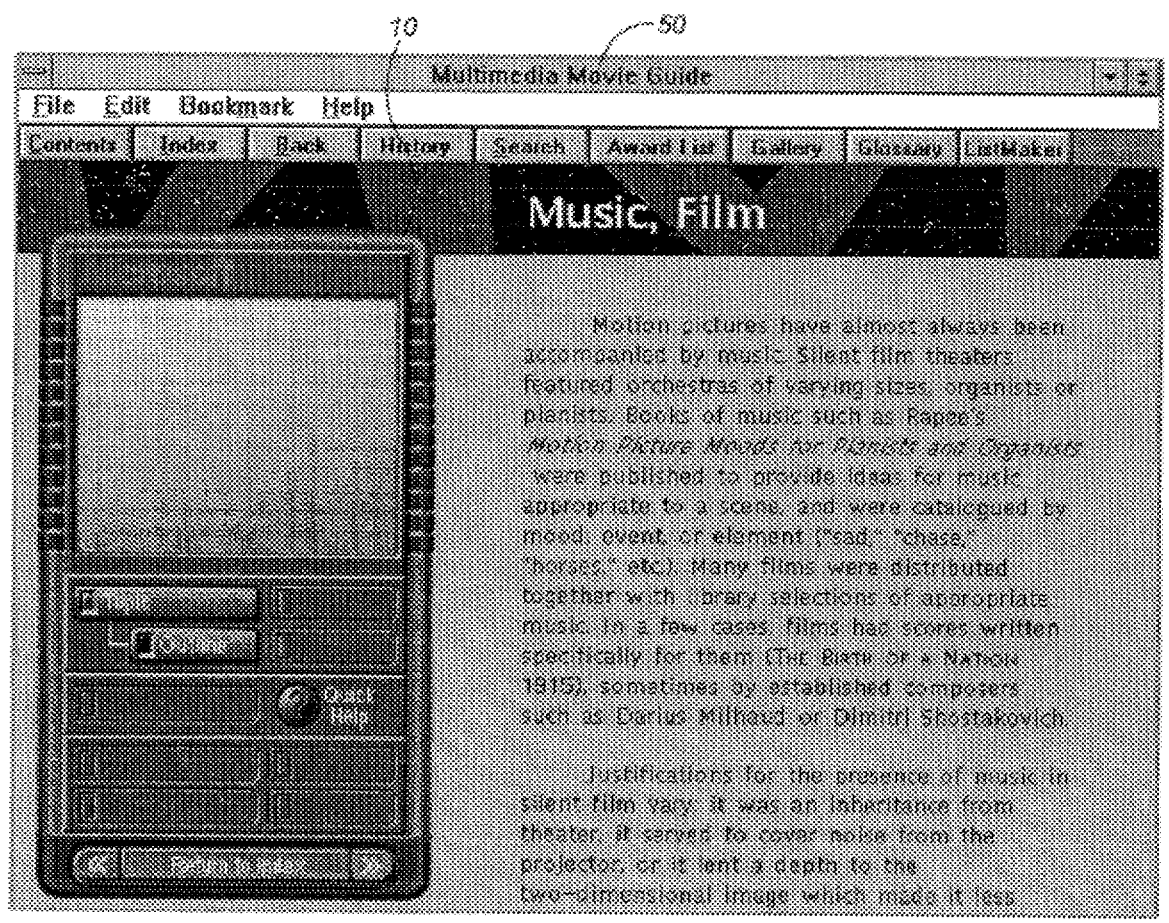
FIG. 6 illustrates the remote controller of the topical articles screen.

By selecting the "Topics" button (34) on the remote controller (10) illustrated in FIG. 3, the remote controller (10) of FIG. 6 is displayed on the visual display (50) of the computer system. This remote controller allows the user access to various articles which explain some aspect of the film industry.

Figure 7A:
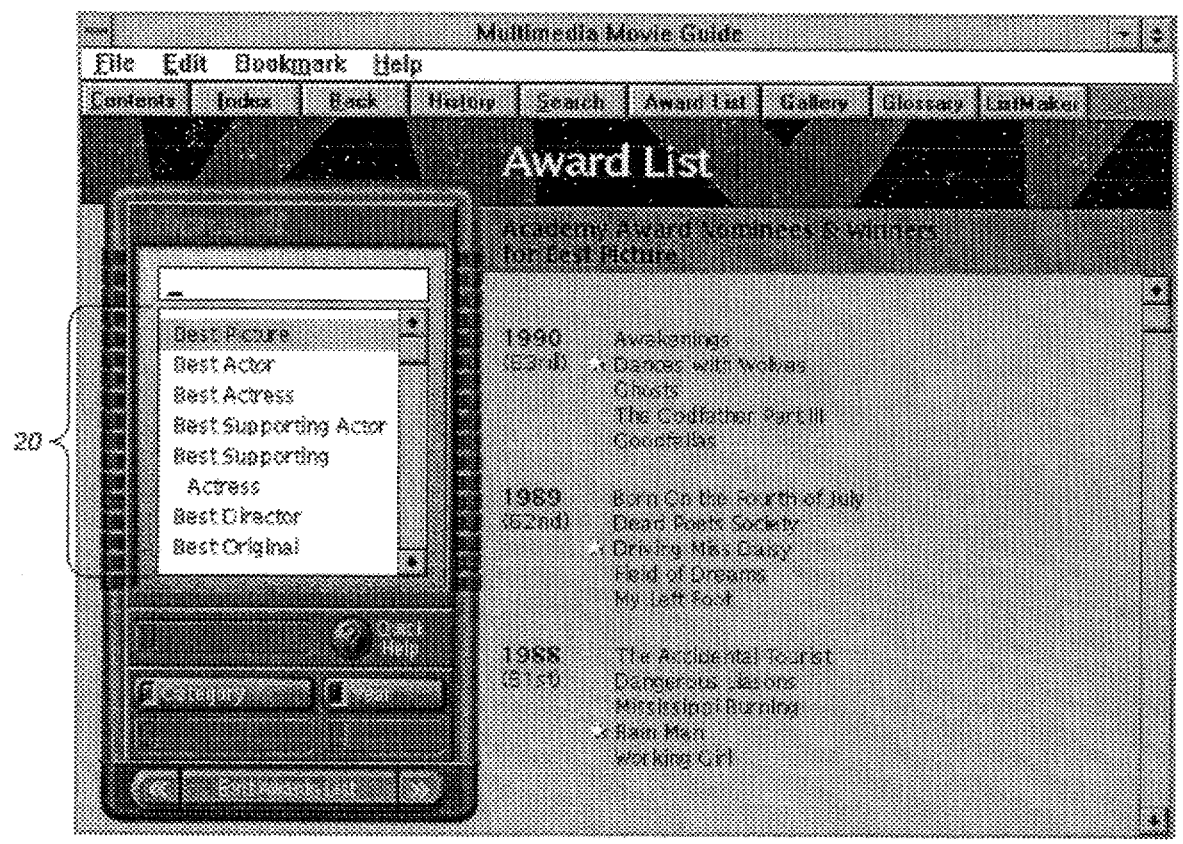
FIGS. 7(a) and 7(b) illustrate the remote controller of the award list screen, including the various information depicted within the remote controller window screen.
Figure 7B:
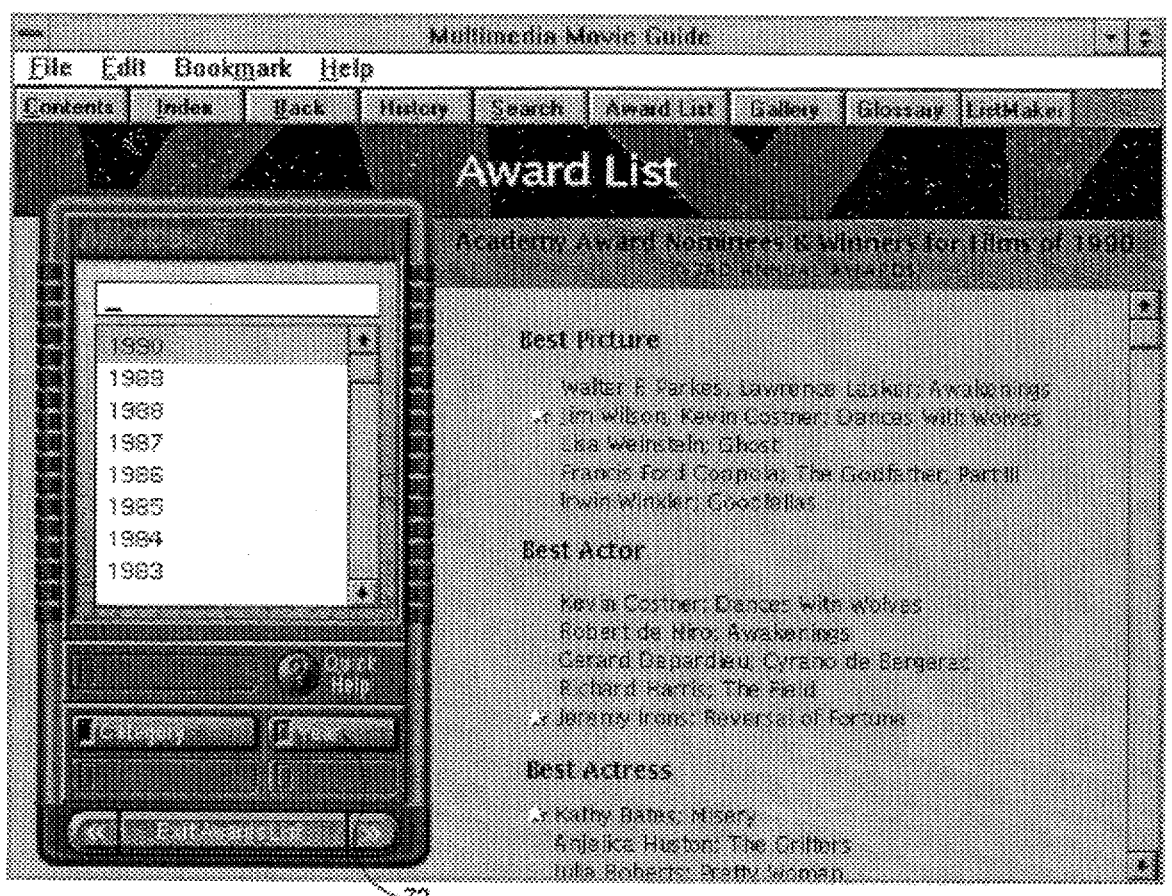

The remote controller illustrated in FIG. 3 may also access applications which have their own functionality. For example, when the button "Award List" (36) is selected, the remote controller (10) allows the user to access information regarding all Oscar nominations and winners from the first Academy Awards to the present. As illustrated in FIG. 7(a), the awards categories may be listed in the remote controller display window (20) for selection by the user. Alternatively, the remote controller "Year" button (72) allows the user to select from films of a specific year as illustrated in FIG. 7(b).

Figure 8:
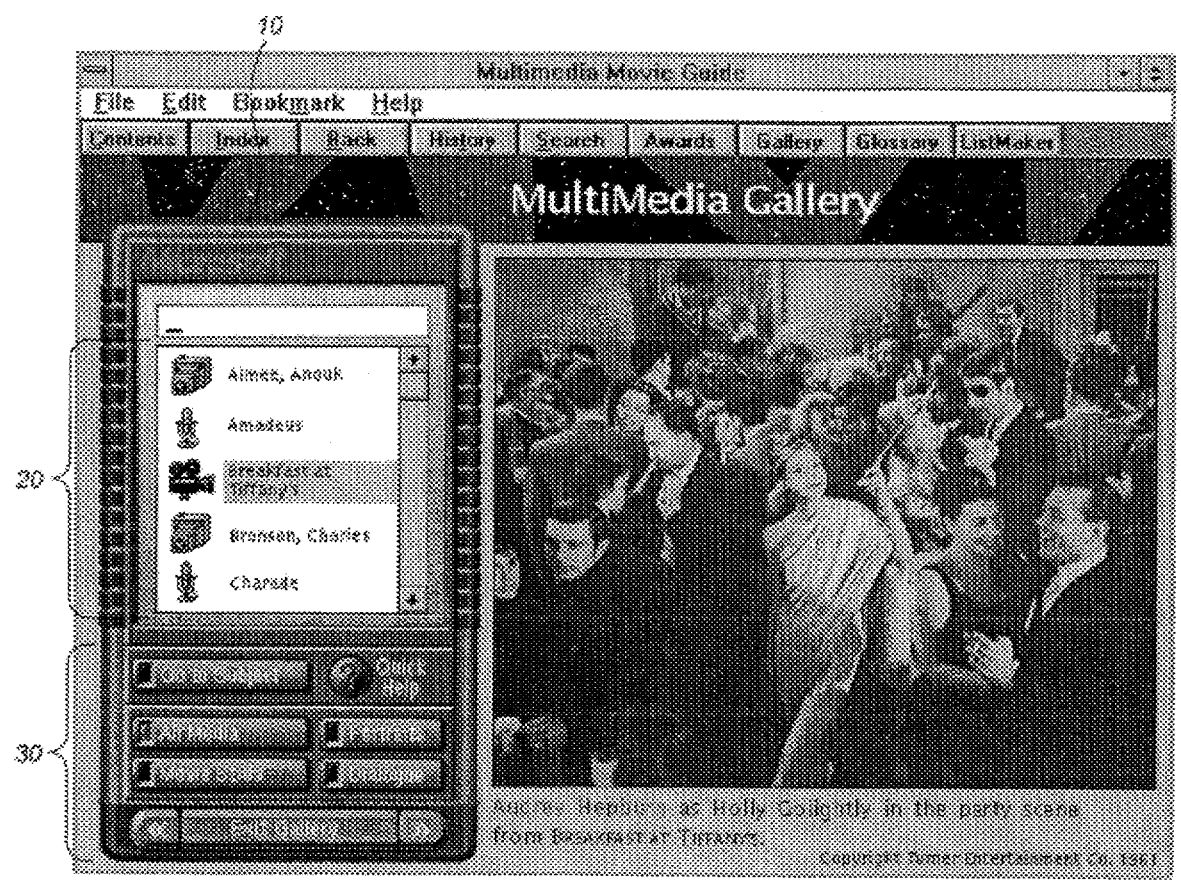
FIG. 8 illustrates the remote controller of the gallery screen.

The remote controller may also display a "Gallery" of media elements, just as one might browse through the pictures in a book without reading the associated text. As depicted in FIG. 8, the remote controller (10) allows the user to select from a variety of elements graphically and visually displayed in the remote controller display window area (20). By choosing the appropriate command from the button bank area (30), the user may go directly to all or a portion of the article to which any given element belongs.

Figure 9:
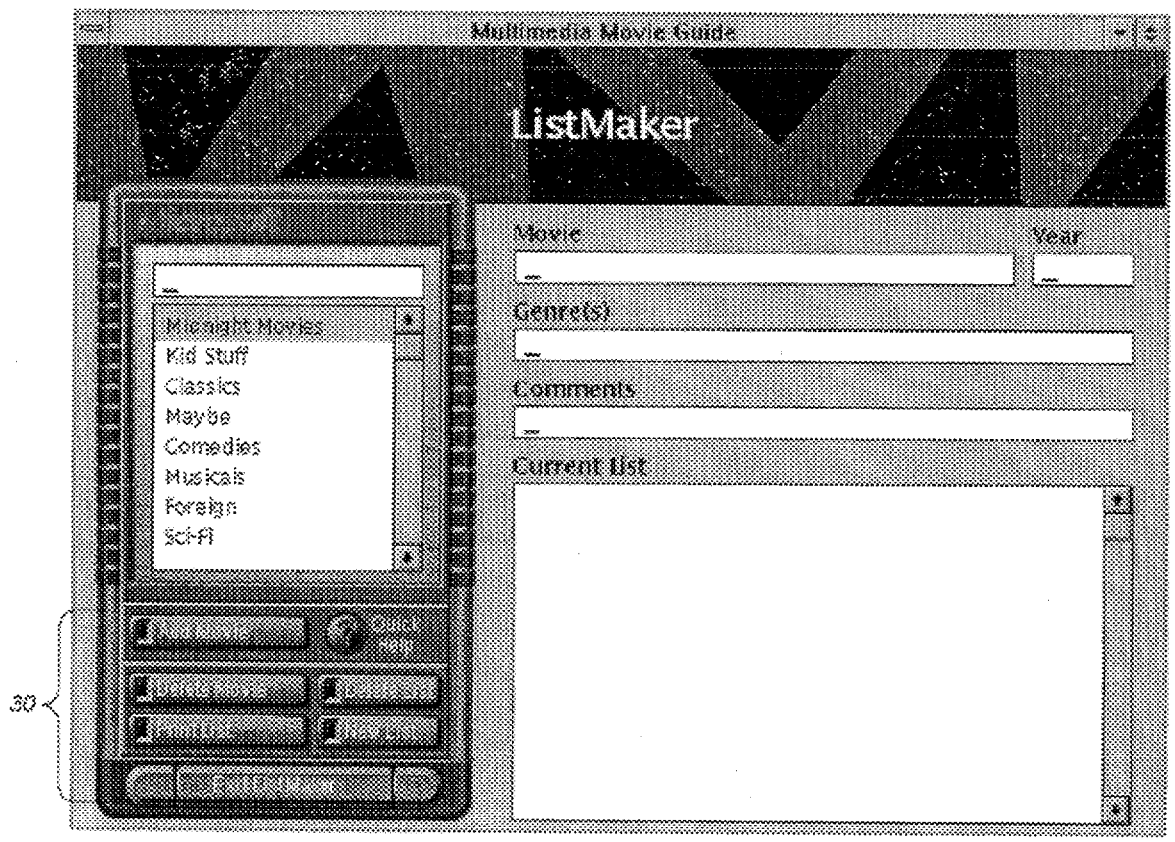
FIG. 9 illustrates the remote controller of the listmaker screen.
Figure 10:
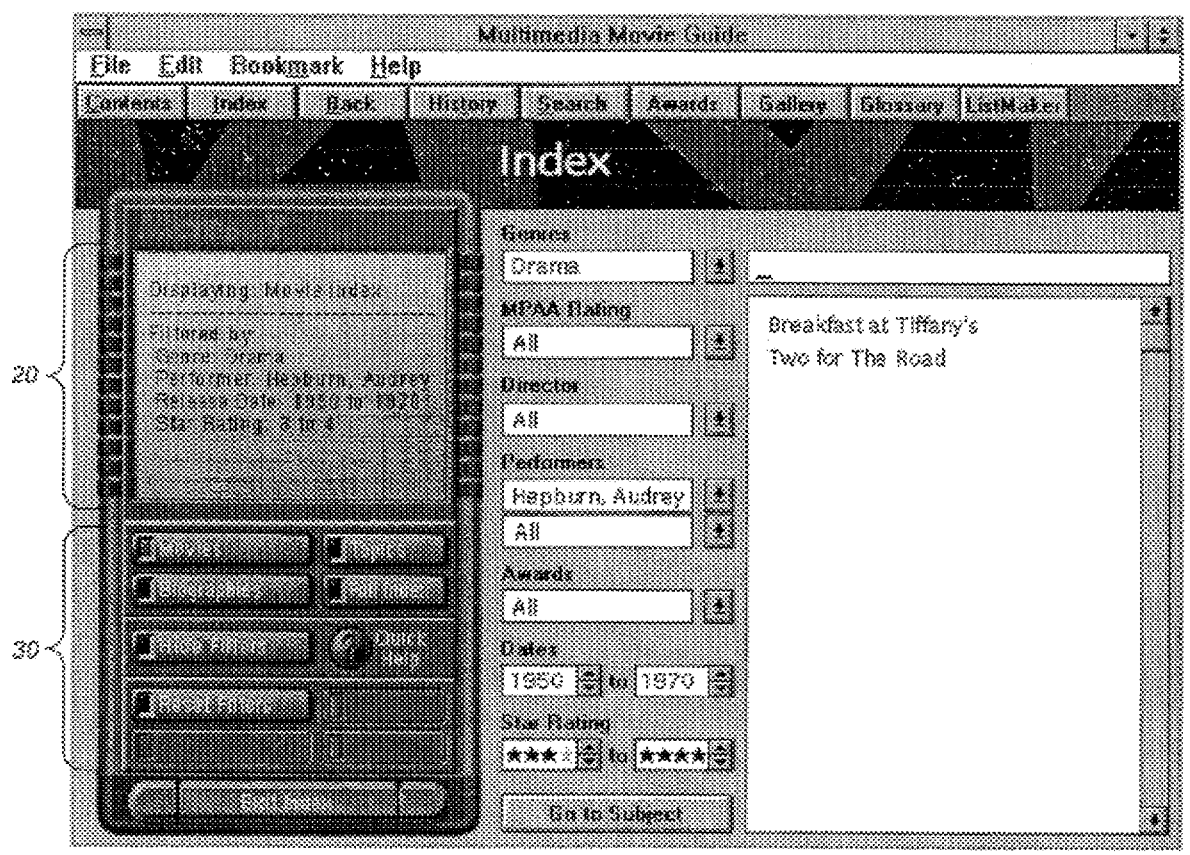
FIG. 10 illustrates the remote controller of the index screen.

Additional functions, including the "Glossary" button (37) and the "List Maker" button (38) of FIG. 3 allow the user to browse through the entire glossary, and allows the user to create, modify, save and print custom lists of movies. For example, selecting the "ListMaker" button (38) of FIG. 3 yields FIG. 9 wherein, the user may create and modify lists of movies. The button bank area (30) of the remote controller (10) of FIG. 9 allows the user to add or delete movies, make a new list or delete an existing list, and print a list. The remote controller may also serve as an index for access to the information of the computer system. As depicted in FIG. 10, the remote controller window display area (20) contains the search parameters or filters selected by the user, and the button bank area (30) contains various selectable commands.

The remote controller of the present invention offers a computer user (especially a user who has little or no computer experience) an immediate familiarity with the computer. The user may draw upon a physical act (e.g., using a remote control to change the channel on a television or to change the volume on a stereo) when confronted with the remote controller of this invention. This user interface allows immediate access to the information stored on a computer system, and provides a convenient and recognizable device for manipulating the computer. In addition, the remote controller of the present invention provides advantages over its physical counterparts. Specifically, the window display area of the remote controller permits the display of information in a wide variety of formats, such as pictures, textual information, and graphical representations. Thus, information is effectively conveyed to the user by and through the remote controller itself.

While this invention has been shown and described with reference to a preferred embodiment, it will be understood by those skilled in the art that various changes or modifications in form and detail may be made without departing from the spirit and scope of this invention.

I claim:

1. A computer system comprising:

a display device operatively connected to a computer;

means for displaying on at least a portion of the display device a graphic depiction of a remote control transmission device, which resembles an analogous physical remoate controller, having a display window area and a button bank area with a plurality of buttons, the display window area displaying contents comprising textual, pictorial, or graphical information, wherein the plurality of buttons in response to selection selectably control the contents displayed in the display window area; and means for selecting a button within the button bank area to control the contents displayed in the display window area of the graphic depiction of the remote control transmission device.

2. The computer system of claim 1, further comprising a computer program that provides a guide to a plurality of movies and wherein the plurality of buttons of the button bank of the graphic depiction of the remote control transmission device selectably control display of information in the display window area about at least one of the plurality of movies.

3. The computer system of claim 2 wherein the display of information about the at least one of the plurality of movies pertains to at least one of a movie listing, biographical data, filmography data, movie credits, a detailed review, an overview, an award list, a movie gallery, a movie list maker, a movie glossary, and a movie still.

4. The computer system of claim 2, further comprising an indexing means to generate and display an index of the information displayed about the at least one of the plurality of movies based upon filtering data.

5. A method in a computer system having a display device, the method comprising the steps of:

displaying on a portion of the display device a graphic depiction of a remote controller which resembles an analogous physical television or stereo remote controller transmission device, wherein the graphic depiction of the remote controller displayed on the display device has a display window area sized to display as contents at least one of pictorial, textual, and graphical information, and a button bank area having a button which selectably controls the contents displayed in the display window area; and in response to user selection of the button, modifying the contents displayed in the display window area.

6. A method in a computer system for providing a user interface to a computer program executing on the computer system, the method comprising the steps of:

displaying, on a portion of a display device of the computer system, a remote controller visual representation of a physical remote control transmission device, the remote controller visual representation having a bounded shape and containing within the bounded shape a display window area and a button bank area having at least one button that corresponds to a function of the computer program and that selectably controls contents of the display window area;

displaying as contents of the display window area of the remote controller visual representation at least one of pictorial, graphical, and textual information;

selecting a button of the button bank area;

in response to the selection of the button, sending to the computer program an indication of the selected button; and under control of the computer program, receiving the indication of the selected button; and in response to receiving the indication of the selected button, causing the contents of the display window area to be modified according to the function corresponding to the selected button.

7. The method of claim 6, further comprising the step of, in response to selection of the button, changing the color of the button to indicate that the button is selected.

8. The method of claim 7 wherein the step of changing the color of the selected button is indicated by displaying a representation of a light in a portion of the selected button.

9. The method of claim 6, further comprising the step of, in response to selection of the button, displaying the selected button as a depressed button.

10. The method of claim 6 wherein the button bank area contains at least one shadowed representation of a button that does not selectably control the pictorial or graphical information displayed in the display window area.

11. The method of claim 6 wherein the computer program is a guide to a plurality of movies and further comprising the step of, in response to receiving the indication of the selected button, displaying information about at least one of the plurality of movies, and wherein the step of causing the contents of the display window area to be modified according to the function corresponding to the selected button displays a portion of the information about the at least one of the plurality of movies.

12. The method of claim 11 wherein the step of, in response to receiving indication of the selected button, displaying information about at least one of the plurality of movies displays information pertaining to at least one of movie listings, biographical data, filmography data, movie credits, a detailed review, an overview, an award list, a movie gallery, a movie list maker, a movie glossary, and a movie still.

13. The method of claim 11, further comprising the steps of:

displaying a field with filter data; and generating an index to the displayed information about the at least one of the plurality of movies based upon the displayed filter data.

14. A method in a computer system for providing a user interface to a computer program, the method comprising the steps of:

generating and displaying, on a portion of a display device of the computer system, a remote controller graphic representation of a physical remote control transmission device having a bounded shape and containing within the bounded shape a display window area and a button bank area having at least one button that selectably controls contents of the display window area;

displaying as contents of the display window area of the remote controller graphic representation at least one of pictorial, graphical, and textual information;

selecting a button of the button bank area; and in response to the selection of the button,
displaying a field for receiving filter data;
receiving filter data into the field; and
modifying the contents of the display window area according to the received filter data.

15. A computer-readable memory medium containing instructions for controlling a computer processor in a computer system to provide a graphical user interface to the computer system by performing the steps of:

displaying, on a portion of a display device of the computer system, a graphic depiction of a remote controller which resembles a physical remote controller transmission device, the graphic depiction of the remote controller transmission device having a display window area that displays as contents at least one of pictorial, textual, and graphical information, and having a button bank area with a button that selectably controls the contents displayed in the display window area; and in response to user selection of the button, modifying the contents displayed in the display window area.

16. The computer-readable memory medium of claim 15 wherein the graphical user interface provides a guide to a plurality of movies, and further controlling the computer processor by performing the step of, in response to receiving the indication of the selected button, displaying information about at least one of the plurality of movies, and wherein the step of modifying the contents displayed in the display window area displays a portion of the information about the at least one of the plurality of movies.

17. The computer-readable memory medium of claim 16 wherein the step of, in response to receiving the indication of the selected button, displaying information about at least one of the plurality of movies displays information pertaining to at least one of movie listings, biographical data, filmography data, movie credits, a detailed review, an overview, an award list, a movie gallery, a movie list maker, a movie glossary, and a movie still.

18. The computer-readable memory medium of claim 16, further controlling the computer processor by performing the steps of:

displaying a field with filter data; and generating an index to the displayed information about the at least one of the plurality of movies based upon the displayed filter data.

\* \* \* \* \*